United States Patent
Kolomeitsev et al.

(10) Patent No.: US 6,853,159 B2
(45) Date of Patent: Feb. 8, 2005

(54) APPARATUS AND METHOD FOR GENERATING TORQUE

(75) Inventors: Sergei F. Kolomeitsev, Rochester, MI (US); Craig A. Ham, Rockford, MI (US)

(73) Assignee: Valeo Elctrical Systems, Inc., Auburn Hills, MI (US)

( * ) Notice: Subject to any disclaimer, the term of this patent is extended or adjusted under 35 U.S.C. 154(b) by 7 days.

(21) Appl. No.: 10/609,894

(22) Filed: Jun. 30, 2003

(65) Prior Publication Data

US 2004/0263101 A1 Dec. 30, 2004

(51) Int. Cl.$^7$ .............................................. H02K 17/32
(52) U.S. Cl. ...................................... 318/434; 388/800
(58) Field of Search .......................... 308/800; 318/432, 318/800, 434

(56) References Cited

U.S. PATENT DOCUMENTS

| | | |
|---|---|---|
| 4,079,301 A | 3/1978 | Johnson, III |
| 4,328,447 A | 5/1982 | Davis et al. |
| 4,434,389 A | 2/1984 | Langley et al. |
| 4,489,261 A | 12/1984 | Hartwig et al. |
| 4,550,267 A | 10/1985 | Viadya |
| 4,825,131 A | 4/1989 | Nozaki et al. |
| 4,896,088 A | 1/1990 | Jahns |
| 4,896,089 A | 1/1990 | Kliman et al. |
| 4,948,998 A | 8/1990 | Fink et al. |
| 5,351,336 A | 9/1994 | Wilkerson |
| 5,367,600 A | 11/1994 | Wilkerson |
| 5,428,522 A | 6/1995 | Millner et al. |
| 5,568,034 A | 10/1996 | Huggett et al. |
| 5,780,990 A | 7/1998 | Weber |
| 5,898,288 A | 4/1999 | Rice et al. |
| 6,020,711 A | 2/2000 | Rubertus et al. |
| 6,097,127 A | 8/2000 | Rivera |
| 6,144,125 A | 11/2000 | Birkestrand et al. |
| 6,194,849 B1 | 2/2001 | Wilson-Jones et al. |
| 6,206,170 B1 | 3/2001 | Kissel et al. |
| 6,208,923 B1 | 3/2001 | Hommel |
| 6,262,544 B1 | 7/2001 | Disser et al. |
| 6,271,637 B1 | 8/2001 | Kushion |
| 2002/0172510 A1 * | 11/2002 | Kobayashi et al. ......... 388/800 |
| 2003/0057916 A1 * | 3/2003 | Davis et al. ................ 318/800 |

OTHER PUBLICATIONS

DC Motors Speed Control Servo Systems, Electro–Craft Corporation, 1600 Second Street South, Hopkins, MN 55343 (Third Edition dated Oct. 1975).

Noodleman, S. "Parameters and Characteristics of Torque and Servomotors." Inland Motor Division. Cleveland Engineering Society. Apr. 30, 1973.

Taft, Charles K. "Concepts of D–C Brushless Motors." Electronics Magazine. (Aug. 1984).

Vaidya, Jayant G. "Optimization of Brushless DC Motor Design." Sundstrand Corporation (Jun./Jul., 1982).

Erdman, D.M., H. B. Harms, J. L. Oldenkamp. Electronically Commutated DC Motors for the Appliance Industry.

Amberkar, Sanket et al. "A Comprehensive Hazard Analysts Technique for Safety–Critical Automotive Systems," Delphi Automotive Systems, SAE 2001 World Congress, Mar. 5–8, 2001.

Ortmeyer, T.H. and P. Pillay. "Trends in Transportation Sector Technology and GHS Emissions," Proceedings of the IEEE, vol. 89, No. 12 (Dec. 2001), pp. 1837–1847.

* cited by examiner

*Primary Examiner*—Karen Masih
(74) *Attorney, Agent, or Firm*—Jacox Meckstroth & Jenkins

(57) ABSTRACT

Torque generating apparatus and method for automotive applications. A brushless DC motor is design optimized to operate at a design voltage, Vs, along an optimal speed/torque profile. A DC/DC converter is provided for supplying power at an alternate voltage, Va, to enable motor operation at speed/torque combinations not on the optimal profile. A switch is provided to enable the motor to be operated selectively at either of the two voltages.

12 Claims, 2 Drawing Sheets

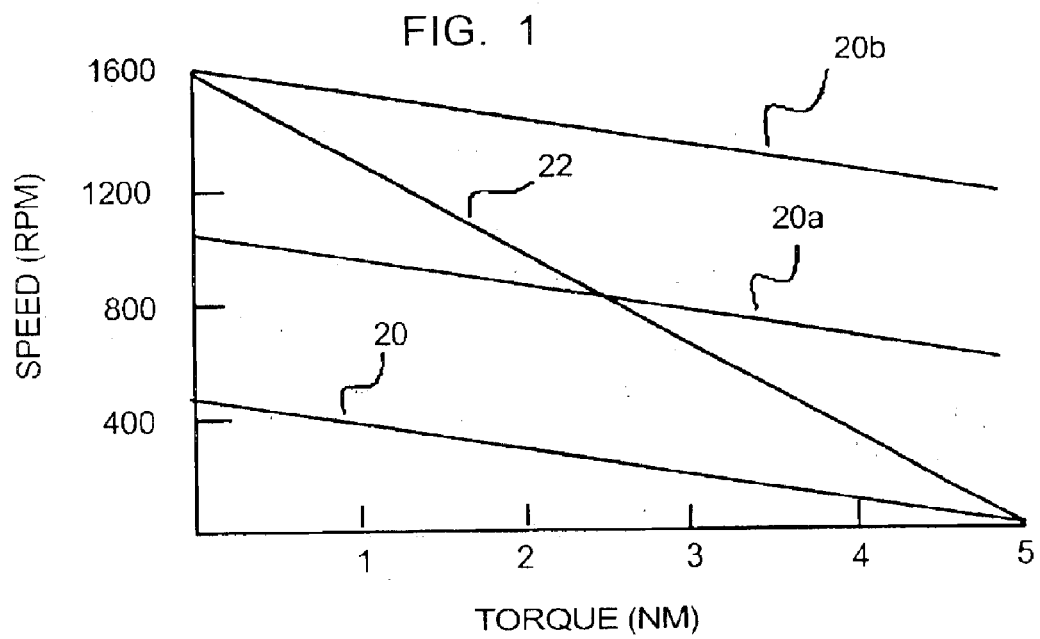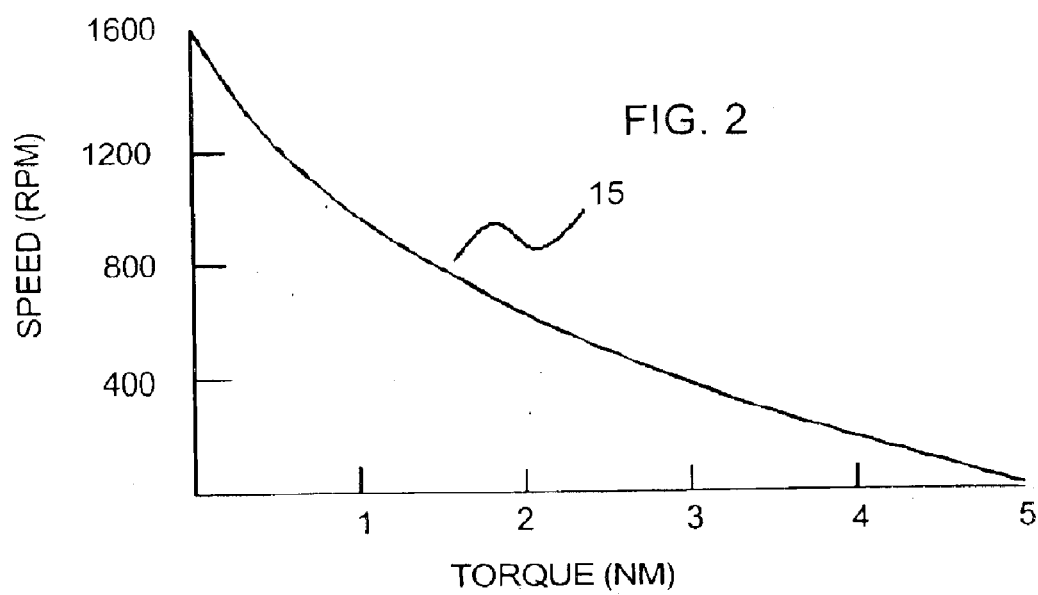

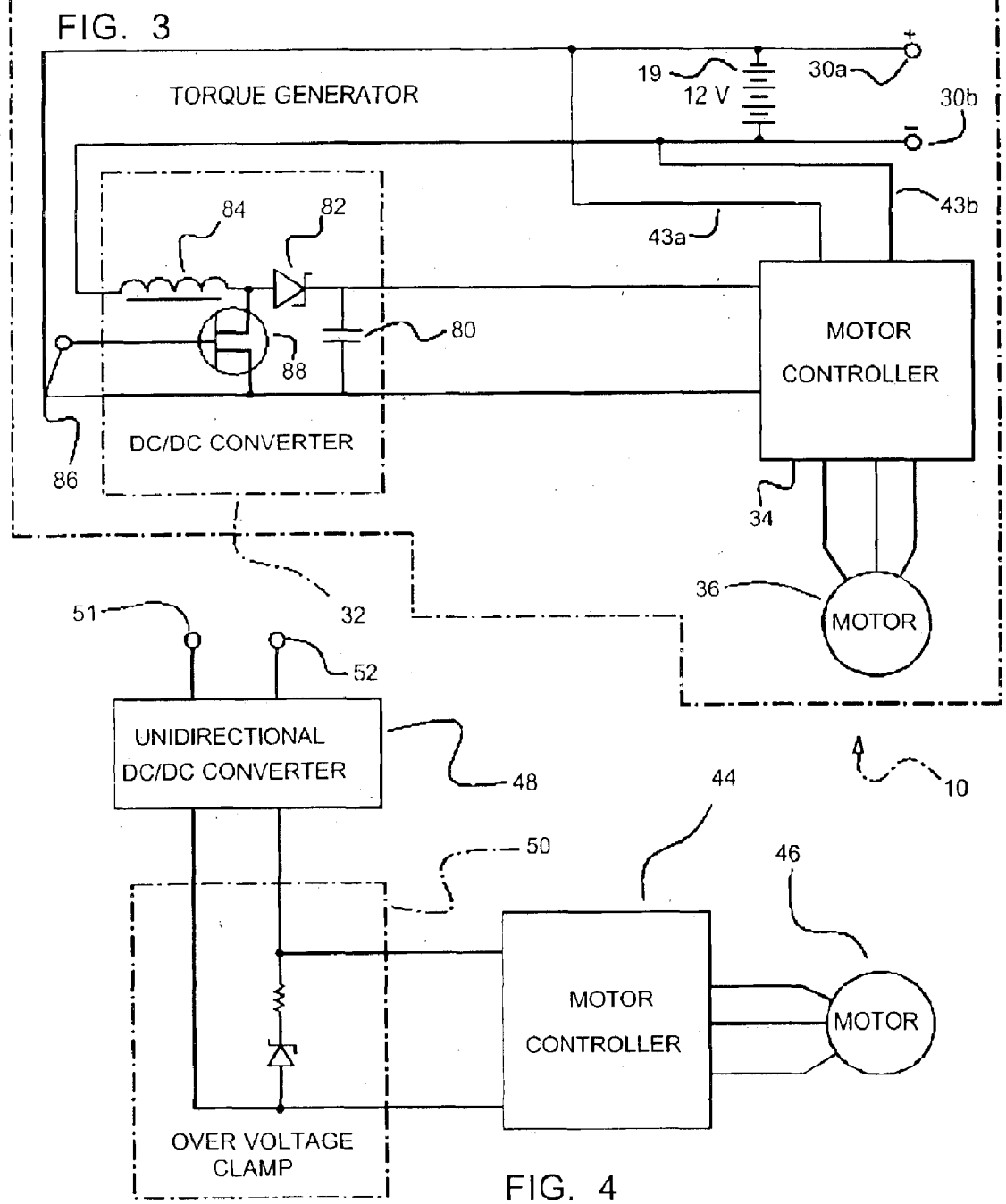

APPARATUS AND METHOD FOR GENERATING TORQUE

BACKGROUND OF THE INVENTION

This invention relates to the field of torque generation and, more particularly, to torque generators for use in motor vehicles. Such torque generators are used, for example, as drivers for brake-by-wire systems and power steering systems. These torque generators comprise an electric motor and a power supply, typically a shared 12-volt battery.

Many compromises must be made in the course of designing a new torque generator. They arise out of conflicting cost, performance and geometrical requirements, and may involve consideration of a myriad of miscellaneous matters, such as manufacturing cost, reliability, maintainability, safety, environmental impact, etc. Even conflicting intellectual property rights may be thrown into the mix. Additionally, the designers of a new torque generator for use in a motor vehicle must consider matters peculiar to the automotive industry, such as customer preferences, industry standards and governmental regulations.

Thus the design of a state-of-the-art torque generator is a daunting task, particularly in the case of torque generators for automotive application. This is due, at least in part, to pervasive, widespread use of 12-volt DC electrical systems in motor vehicles. At least within the United States, 12 V systems have become standard. This has led to wide availability of 12 V electrical components at reasonable cost. It also creates a strong incentive to use 12 V components in torque generators for automotive application. Unfortunately, traditional 12 V motor designs are not able to meet conflicting performance and packaging requirements established by the automotive industry.

Motors that meet free speed and maximum torque specifications require high levels of electrical current. Such currents are possible only if the field windings are fabricated from relatively large gauge, low resistance, (e.g. 30 m$\Omega$) wire. The construction of such large gauge field windings consumes a relatively large amount of copper, thereby increasing the cost of the motor. The use of large gauge field windings also boosts the size of the motor package, so that miniaturization of the torque generator becomes more difficult.

It is customary to optimize the design of brushless DC motors so as perform efficiently in their intended applications. The design process involves selection of an input voltage and selection of a variety of parameters such as the back EMF, the winding inductance per phase, operating points for input voltage, and commutation angle for specific load characteristics. The result of the design is a motor having a speed/torque profile which minimizes power consumption during the expected principal use.

The prior art includes small, brushless 12 V DC motors which are able to meet presently applicable torque requirements, except as to free speed There is a need for a small DC torque generator able deliver high free speed and also high torque, both at low current.

SUMMARY OF THE INVENTION

The present invention contemplates generation of torque in a motor vehicle with the aid of a brushless DC motor, operable at two or more substantially different voltages, one being a "design voltage" for which the brushless DC motor, has been optimized and all others being alternate voltages.

According to this invention, a brushless DC motor is supplied with power at the design voltage and runs at speed/torque combinations along a default speed/torque profile associated with the design voltage. The motor may also be run, albeit non-optimally, at each available alternate voltage. Each alternate voltage has an associated alternate speed/torque profile. There is a switch having input terminals for the design voltage and for each alternate voltage. When it is desired to run the motor at a speed/torque combination not on the default profile, the switch is operated to power the motor by an alternate voltage having a speed/torque profile passing through the coordinates of the speed/torque combination of interest.

Preferably, the alternate voltages are obtained by conversion from power supplied at the design voltage by a DC power source. Preferably the DC power source is a 12 V battery shared with other 12 V equipment.

A torque generating apparatus according to this invention includes a DC power source of voltage Vs; a DC/DC converter connected to the DC power source and adapted to convert DC power at voltage Vs to DC power at an alternate voltage Va, a brushless DC motor design optimized for operation at the voltage Vs; the brushless DC motor being responsive to power at a voltage Vs by achieving speed/torque combinations falling on a default speed/torque profile defining optimal operation of the brushless DC motor, and the brushless DC motor being further adapted to achieve speed/torque combinations not falling on the default speed/torque profile by operating at the alternate voltage Va, and a switch adapted to put the brushless DC motor selectively into communication with either the DC power source or the DC/DC converter.

A method of applying torque to a motor vehicle according to the invention includes the steps of: acquiring a brushless DC motor, design optimized for operation at speed/torque combinations along a default speed/torque profile when activated by a source voltage Vs, and able to reach selected alternate speed/torque combinations not on the default speed/torque profile when activated by an alternate voltage Va, selecting a voltage from the group consisting of Vs and all of the Va, and operating the motor at the selected voltage.

Accordingly, it is an object of the present invention to supply torque to an automotive accessory optimally along a default speed/torque profile, while retaining an ability to supply torque to the automotive accessory at a different speed/torque combination not on the default speed/torque profile.

Another object of the invention is to provide an improved torque generator which is deliverable in a small package optimized for automotive use, and able to produce a range of speed/torque combinations of greater diversity than previously have been available in a single motor.

Other objects and advantages of the invention will be apparent from the following description, the accompanying drawings and the appended claims.

BRIEF DESCRIPTION OF THE DRAWING

FIG. 1 is a sketch showing the effect of applied voltage upon achieved speed/torque.

FIG. 2 is a sketch of a speed/torque profile.

FIG. 3 is a sketch of one embodiment of a torque generator according to the invention.

FIG. 4 illustrates the invention in an alternative embodiment.

DETAILED DESCRIPTION

This invention provides an improved torque generator which may take the form of torque generator 10 of (FIG. 3), deliverable in a small package optimized for automotive use, and able to produce a range of speed/torque combinations of greater diversity than previously have been available in a single motor. This versatility is achieved by providing a DC/DC converter 32 to make selective upward adjustment of the system voltage of a small 12 V, brushless, DC motor, such as motor 36 of FIG. 3. This enables the motor to operate with the required response while meeting both the packaging and current consumption requirements. Raising the voltage of a given motor increases the motor power, providing higher speed for a given torque. Shown in FIG. 1 is the effect of raising the voltage of a motor designed for 12 V operation, neglecting current limits and saturation effects.

Referring now to FIG. 1, there is drawn a slanted line 20 approximately representing a speed/torque profile for a motor, optimally designed for operation at 12 V and also running at 12 V. Further drawn on FIG. 1 are three other lines 20a, 20b and 22. Lines 20a and 20b are speed/torque profiles for the same motor running at 24 V and 36 V, respectively. Line 22 represents a speed/torque profile for a motor optimally designed for operation at 36 V and running at 36 V. The latter line is shown for comparison.

Varying the system voltage allows motor performance to be adjusted continuously, so as to provide unconventional speed/torque profiles. This is useful, for example, in limiting motor temperatures during handling of certain loads. A hypothetical example is illustrated by line 15 on FIG. 2. When reduced performance is acceptable the system operates at a lower voltage level, minimizing converter losses. The optimized system design will operate at 12 V (converter off) at maximum torque to keep peak current low. In case thermal issues are not a concern, the motor system may be operated to perform similarly to a motor of conventional 36 V design.

A variable voltage controller allows the motor to be operated at constant power over its entire speed range. If voltage is increased as speed and back emf increase, the current can remain constant at the 12 V stall level. This implies an increase in current drawn from the vehicle for low load conditions but offers a system with improved performance. Component utilization is improved since the system has the ability to operate at max current over a larger portion of the speed range. In addition, components used in the motor controller can be conventional 60 V devices and still meet load dump requirements since the input voltage is controlled.

FIG. 3 illustrates a torque generator 10, configured to embody the invention in a simplified form. Referring now to FIG. 3, attention is directed toward motor 36, which is optimized to run at speed/torque combinations indicated by a default speed/torque profile 15 of FIG. 2. when operated at its design voltage of 12 Volts. While motor 36 runs optimally at 12 V, it may run, albeit non-optimally, at other voltage levels such as 24 V or 36 V to achieve performance as generally indicated by lines 20a, 20b of FIG. 1. Motor 36, shown in FIG. 3 as a three-phase device, may be a single phase or other multi-phase motor. It is powered by a width-modulated square wave supplied by a motor controller 34. A suitable motor is described in detail in Fradella U.S. Pat. No. 4,085,355.

Those skilled in the DC motor art will be familiar with a number of techniques for optimizing the design of a brushless DC motor. One such technique is described in a paper by Javant G. Vaidya entitled "Optimization of Brushless DC Motor Design", Drives and Controls International June/July 1982 at P. 20 et. seq. Another pertinent reference along that line is an engineering handbook by Electro-Craft Corporation entitled "DC Motors, Speed Controls, Servo Systems", Expanded Third Edition, 1975, especially at P. 2–60

Power for the operation of motor 36 is supplied by a source 19, preferably a 12 V battery which is shared with other systems via a pair of terminals 30a, 30b. Source 19 supplies DC current at 12 V to a DC/DC converter 32, which may be a simple circuit such as the one illustrated in FIG. 3, or, alternatively, a somewhat more complicated circuit of a type as taught in Ling U.S. Pat. No. 6,515,463 B2, Ying et al U.S. Pat. No. 6,388,897, or Belson U.S. Pat. No. 4,254, 459. The Belson patent shows use of DC/DC converters in automotive applications.

The 12 V DC received by DC/DC converter 32 is converted into DC at another voltage having a level depending upon the inductance of an inductor 84. There is a FET 88, which functions as a switch and which is toggled by an ON/OFF signal at a gate terminal 86. When FET 88 is turned OFF, there is a DC flow through inductor 84, a diode 82 and a capacitor 80. This flow continues, until capacitor 80 is charged up to 12 volts, the design voltage for motor 36. This causes transmission of a 12 V DC signal to motor controller 34 for powering motor 36. When FET 88 is gated ON, motor controller 34 sees 12 volts DC less a drop through inductor 84. That is the alternate voltage to be used for controlling the speed/torque combination of motor 36.

Motor controller 34 draws power at 12 V DC from voltage source 19 and chops it to create a width-modulated square wave having a duty cycle corresponding to the voltage of the output from DC/DC converter 32. The width-modulated signal is applied to the windings of motor 36.

It is a feature of this invention that the voltage necessary for operating the motor at speed/torque combinations not on the default speed/torque profile is obtained by boosting the design voltage used for normal, optimal operation. The voltage boost system can be implemented with various levels of complexity depending upon the performance needs. Unidirectional current flow may be implemented quite simply, as shown in the embodiment of FIG. 3. A four-quadrant system needs to manage bi-directional flow, if the generated energy exceeds the capability of the bus capacitors. An example of one implementation is shown in FIG. 4. Shown there is a brushless DC motor 46 controlled by a motor controller 44 to operate at a voltage level generated by a unidirectional DC/DC converter 48 and clamped by an over voltage clamp 50.

While the forms of apparatus and the and the method herein described constitute preferred embodiments of the invention, it is to be understood that the invention is not limited to these precise embodiments and that changes may be made therein without departing from the scope of the invention.

What is claimed is:

1. Torque generating apparatus comprising:
   (a) a DC power source of voltage Vs;
   (b) a DC/DC converter connected to said DC power source and adapted to convert DC power at said voltage Vs to DC power at an alternate voltage Va;
   (c) a brushless DC motor design optimized for operation at said voltage Vs, said brushless DC motor being responsive power at said voltage Vs by achieving speed/torque combinations falling on a speed/torque profile defining optimal operation of said brushless DC motor, said brushless DC motor being further adapted to achieve speed/torque combinations not falling on said speed/torque profile by operating at said alternate voltage Va, and (d) a switch adapted to put said brushless DC motor selectively into communication with either said DC power source or said DC/DC converter.

2. Torque generating apparatus according to claim 1 wherein said DC/DC converter comprises a capacitor connected for selective charging to one or the other of voltages Va and Vs.

3. Torque generating apparatus according to claim 2, wherein said switch comprises a field effect transistor connected for controlling a flow of current through said capacitor.

4. Torque generating apparatus according to claim 3 wherein said DC power source provides DC power at 12 V.

5. Torque generating apparatus according to claim 4 wherein said alternate power source provides power at 36 V.

6. In a motor vehicle having a DC power source designed for supplying direct current electricity at a design voltage Vs, torque generating apparatus comprising:

(a) a DC/DC converter connected to said DC power source so as to receive direct current electricity therefrom, said DC/DC converter being configured for converting said power source electricity into DC electricity at an alternate voltage Va, substantially different from said source voltage Vs;

(b) a signal selector configured to receive a first DC signal at said source voltage Vs and a second DC signal at said alternate voltage Va and to generate a third DC signal by making a selection between said first and second DC signals;

(c) a motor controller responsive to said third DC signal by generating motor control signals; and (d) a DC motor, responsive to said motor control signals and designed for optimally generating torque in a motor vehicle equipped with an electrical system operating at said source voltage Vs and also able to generate torque in said motor vehicle, other than optimally, at speed/torque combinations reachable only during selection of said second DC signal by said signal selector.

7. In a motor vehicle, torque generating apparatus comprising:

(a) a brushless DC motor optimized for generating torque at speed/torque combinations along a prescribed speed/torque profile when activated by direct current at a predetermined design voltage, said brushless DC motor also being able to deliver torque at speed/torque combinations away from said profile when activated by a direct current at a predetermined alternate voltage, substantially different from said design voltage;

(b) a power supply providing current at said design voltage;

(c) a DC/DC converter having an input side connected to said power supply for receiving current at said design voltage said power supply and configured for converting current so received into direct current at said alternate voltage; and (d) a switch having an output terminal connected to said brushless DC motor, a first input terminal connected to said DC/DC converter and a second input terminal connected to said DC power supply, said switch being operative for selectively powering said brushless DC motor at either said design voltage or said alternate voltage.

8. A method of generating torque comprising the steps of:

(1) Acquiring as DC motor, design optimized for operation at speed/torque combinations along a default speed/torque profile when activated by a design voltage Vs, and able to reach alternate speed/torque combinations not on said default speed/torque profile when activated by an alternate voltage Va;

(2) connecting said motor to an output terminal of a switch having first and second input terminals, as well as said output terminal;

(3) supplying power at said voltage Vs to said first input terminal;

(4) supplying power at an alternate voltage Va to said second input terminal; and (5) positioning said switch to connect one of said input terminals to said output terminal, so that said motor runs selectively either at a speed/torque combination along said default speed/torque profile or at a speed/torque combination not on said default speed/torque profile.

9. A method according to claim 8, further comprising the step of generating power at said voltage Va by conversion from power at said voltage Vs.

10. A method according to claim 8, wherein said design voltage Vs is 12 volts.

11. A method according to claim 8, further comprising the step of connecting said motor to an automotive accessory.

12. A method according to claim 8 wherein said acquiring step is the step of acquiring a brushless DC motor, design optimized for operation at speed/torque combinations along a default speed/torque profile when activated by a design voltage Vs, and able to reach alternate speed/torque combinations not on said default speed/torque profile when activated by an alternate voltage Va.

* * * * *